United States Patent [19]

Bahder et al.

[11] 4,130,450
[45] Dec. 19, 1978

[54] METHOD OF MAKING EXTRUDED SOLID DIELECTRIC HIGH VOLTAGE CABLE RESISTANT TO ELECTROCHEMICAL TREES

[75] Inventors: George Bahder, Edison; George S. Eager, Jr., Upper Montclair; David A. Silver, Livingston, all of N.J.

[73] Assignee: General Cable Corporation, Greenwich, Conn.

[21] Appl. No.: 785,192

[22] Filed: Apr. 6, 1977

Related U.S. Application Data

[60] Continuation-in-part of Ser. No. 631,314, Nov. 12, 1975, abandoned, which is a division of Ser. No. 467,607, May 6, 1974, Pat. No. 3,943,271.

[51] Int. Cl.$^2$ .......................................... H01B 13/06
[52] U.S. Cl. ........................................ 156/48; 156/47; 427/118; 264/174
[58] Field of Search .................. 156/48, 54, 56, 47; 174/22 R, 22 C, 23 R, 23 C, 102 D; 427/118; 264/174

[56] References Cited

U.S. PATENT DOCUMENTS

| | | | |
|---|---|---|---|
| 2,304,210 | 12/1942 | Scott et al. | 156/56 |
| 2,427,507 | 9/1947 | Powell et al. | 174/114 R |
| 2,479,924 | 8/1949 | Gillis | 174/107 |
| 2,914,501 | 11/1959 | D'Ascoli | 428/520 |
| 3,340,353 | 9/1967 | Mildner | 156/54 |
| 3,617,377 | 11/1971 | Isshiki et al. | 174/107 |
| 3,651,244 | 3/1972 | Silver et al. | 174/36 |
| 3,662,090 | 5/1972 | Grey | 156/54 |
| 3,733,225 | 5/1973 | Moody | 156/48 |
| 3,792,192 | 2/1974 | Plate | 174/107 |
| 3,812,283 | 5/1974 | Kothe et al. | 174/23 R |
| 3,917,900 | 11/1975 | Arnaudin, Jr. | 156/54 |
| 3,943,271 | 3/1976 | Bahder et al. | 174/110 PM |
| 3,944,717 | 3/1976 | Hacker et al. | 156/47 |

Primary Examiner—John T. Goolkasian
Assistant Examiner—William H. Thrower
Attorney, Agent, or Firm—Roy C. Hopgood; John M. Calimafde; Charles W. Neill

[57] ABSTRACT

High-voltage power cables with extruded dielectric plastic insulation, installed underground, have their life shortened by the formation of electrochemical trees in the insulation. This invention provides a high-voltage power transmission cable constructed with sealant in interstices of a stranded conductor that are not filled by the semi-conducting material of a conductor shield of the cable. The construction prevents or greatly delays the formation of electrochemical trees in the insulation of the cable. The sealant prevents entrance of air into the cable at cable ends, and the passage of the humidity of the air through the conductor shield to an interface between the conductor shield and the inside surface of insulation that surrounds the conductor shield.

7 Claims, 6 Drawing Figures

METHOD OF MAKING EXTRUDED SOLID DIELECTRIC HIGH VOLTAGE CABLE RESISTANT TO ELECTROCHEMICAL TREES

RELATED APPLICATION AND PATENT

This application is a continuation-in-part of application Ser. No. 631,314, filed Nov. 12, 1975 now abandoned said application being a division of Ser. No. 467,607, filed May 6, 1974, now U.S. Pat. No. 3,943,271.

BACKGROUND AND SUMMARY OF THE INVENTION

In the case of high voltage power cables, lead sheaths and in more modern times, plastic-coated metal foil, have been used to prevent moisture from entering power cables. It was thought that moisture is necessary for the growth of electrochemical trees because it was common in underground cables, but applicants found that electrochemical trees grow in cables that are installed under conditions where there is complete sealing against entrance of moisture into the cable.

The invention of this application is based on the discovery that even where no moisture can enter a buried cable, the moisture was already there before the cable was buried. Although the trees grow from the inside surface of the insulation, that surface is sealed in a power cable against moisture because it was extruded over a semi-conducting shield.

We conceived the idea that air in a cable, even though the air contained relatively low humidity, might have enough moisture to support tree growth, and might come into the cable through the ends of the cable before the cable is installed, or at the time of making splices; and that the way in which the humidity reaches the inside surfaces of the insulation is by permeation as vapor through the insulation shield. The reason that the trees do not start in the insulation shield is because that shield is semi-conducting and therefore does not have electrical stresses high enough to cause electrochemical trees.

Unlikely as this humidity conception seemed to be, we made a high-voltage power cable with soft flexible sealant in those spaces of a bare stranded conductor which are not filled with the plastic material of the conductor shield. This was never done before in high voltage power cables, and with this construction, whatever length of cable might be cut, the ends of the cable were sealed against the entrance of atmospheric air into the cable with whatever moisture that air might contain. The cable of this application was tested under the operating conditions of a high-voltage power cable and for a long enough time for a conventional power cable to show tree formation; and there were no trees.

Some special problems arise which would not be presented in a different kind of cable. For example, it is desirable to limit the sealant to the inner interstices of a stranded cable and to leave the helical valleys on the outside surface of the conductor substantially free of sealant so that the semi-conducting material of the conductor shield can enter into these valleys and provide a more intimate contact between the conductor and the conductor shield. The sealant must e compatible with the material of the conductor shield; and the sealant must be capable of withstanding the high temperatures encountered in high-voltage power transmission cables.

Temperatures at the conductor commonly rise to 130° C., and the sealant, though soft and flexible, must be viscous enough at that temperature to prevent the sealant from running or dripping or forming any gas.

Since the sealant extends for the entire length of the stranded conductor, it serves to seal the ends of the cable from entrance of humidity into the cable regardless of where a cable is cut to a required length for a particular installation.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
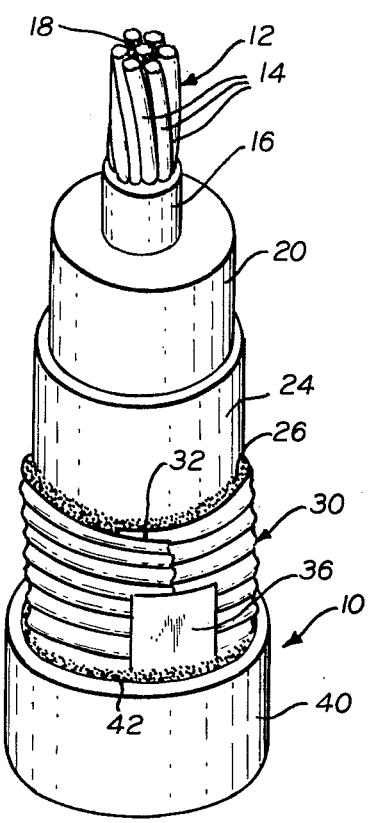
FIG. 1 is an isometric view, with different parts broken away progressively along the length of a cable made in accordance with this invention.
Figure 2:
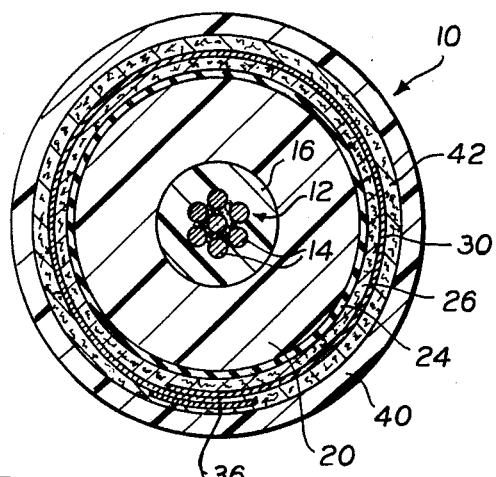
FIG. 2 is an enlarged sectional view taken on the line 2—2 of FIG. 1.

FIG. 1 shows a power cable 10 which includes a center conductor 12 made up of a plurality of strands 14 which are cabled together and covered by a semi-conducting conductor shield 16 such as in conventional high-voltage power cables. The conductor 12 preferably has bar (uninsulated) individual strands 14, and the interstices between strands 14 are filled with a filling compound which constitutes a strand sealant indicated by stippling and designated by the reference character 18 in FIG. 1. Any sealant 18 which gets into the outer valleys of the conductor 12 is preferably not wiped from the outer valleys prior to the extrusion of the conductor shield 16. The sealant is wiped off the outside of the conductor 12 but not out of the valleys. This sealant 18 completely fills all spaces between the strands 14 so that there can be no moisture in the stranded conductor 12 when the conductor shield 16 is extruded over the conductor.

The sealant 18 is applied in a limited amount so as to fill the interstices between the interior surfaces of the strands 14 without filling the valleys around the outside of the conductor 12. To the extent that these helical valleys on the outside surface of the conductor 12 are not filled with sealant, they are filled with the semi-conducting material of the conductor shield 16 when that shield is extruded over the conductor. Thus no air can enter the cable at the end through any interstices of the conductor 12 itself or between the conductor 12 and the extruded conductor shield 16.

The sealant 18 may be an asphalt/rubber or a polyester compound. These materials are named by way of illustration and are preferred materials; but it will be understood that other filling compound can be used as the sealant if it is compatible with the material of the semi-conducting shield 16 and the insulation 20.

This sealant must have special characteristics. First, it must not raise the low resistance of the conductor shield, as, for example, mineral oils, commonly used to soften rubber, will do. Secondly, it must not flow at 130° C. nor crack at −30° C. Thirdly, it must age properly. Fourthly, it must be soft so as to be readily placed between the wires of the conductor. These properties are obtained by using a rubber compound and softening it with asphalt having a high melt index. The rubber material is softened by the use of plasticizer which is extremely viscous and will not flow at 130° C.

If desired, a semi-conducting tape can be placed over the strands of the conductor 12 and the shield 16 can be extruded over this tape. Such a tape can be used if necessary to reduce migration of any ingredients of the strand sealant into the conductor shield 16. When such a semi-conducting tape is used, all spaces betwen it and the conductor are thoroughly filled with the sealant 18 and adheres to the semi-conducting shield 16. The adherence is preferably made light so that the semi-conducting layer can be stripped freely from the conductor. In place of the semi-conducting shield 16 a layer of high dielectric constant material can be used to serve as the stress control layer. Suitable materials are polyethylene, cross-linked polyethylene and ethylene-propylene rubber (EPR).

The conductor shield 16 is preferably polyethylene cross-linked polyethylene, ethylene-propylene rubber (EPR) or a blend of these materials treated to withstand at least 130° C. The shield is made conducting by the use of carbon black, and it is resistant to the longitudinal migration of moisture; or it may be a high dielectric constant stress control material. If the sealant is made semi-conducting, the same material can be used as the sealant and conductor shield.

Insulation 20 is then extruded over the conductor shield 16. The insulation 20 is preferably polyethylene, preferably cross-linked polyethylene, and it is this insulation that is protected against the formation of electrochemical trees. Other suitable insulation can be used such as ethylene-propylene rubber and polyvinyl chloride.

The insulation 20 is extruded tightly over the conductor shield 16 or stress control layer and bonded to it. It is not possible for moisture to penetrate along the interface between the insulation 20 and the conductor shield 16 from cable ends.

An insulation shield 24 is extruded directly over and bonded to the insulation 20. This insulation shield 24 is tightly extruded and because of the tight extrusion and fusion bonding, no moisture can penetrate along the interface between the insulation 20 and shield 24. Shield 24 is preferably made of the same material as the conductor shield 16.

There is a sealant material 26 placed over the outside surface of the semi-conducting insulation shield 24. This sealant 26 sticks to the insulation shield 24; and it may be made of the same material as the sealant 18 which is used in the conductor 12, and it may have an addition of carbon black or other conducting material in sufficient quantity to make the material 26 a semi-conductor.

A metallic shield 30 surrounds the insulation shield 24 outside of the filler 26 and is wrapped around the insulation shield 24 in such a way that the filler 26 occupies any space between the insulation shield 24 and the metallic shield 30. The metallic shield 30 is preferably made of aluminum or copper. It is preferably applied by folding in longitudinally around the insulation shield 24, and it is preferably corrugated to permit easier bending of the cable 10. This longitudinally folded metallic shield 30 has an unbonded lap seam indicated by the reference character 32 and is preferred over the conventional tape shield applied helically around the insulation shield because the longitudinally folded unbonded lap seam metallic shield 30 permits expansion of the cable core as the result of thermal cycling. A helically wound tape applied to a cable core cannot adequately provide for such thermal expansion and subsequent contraction and for handling high fault currents typical of electric utility transmission and distribution systems.

The edges of the metallic shield 30 at the lap seam 32 are free to move circumferentially with respect to one another when the cable expands with increase in temperature; and the metal of the shield 30 again contracts to maintain its tight contact around the underlying core of the cable when the cable cools and contracts.

The lap seam metallic shield 30 with the space under it, including the corrugations, filled with the semiconducting filler material 26, retards moisture ingress into any spaces between the insulation 24 and shield 30. Such an aluminum or copper shield 30 is preferred over lead as lead corrodes easily and builds up the diamter of the cable excessively.

At the lap seam 32 of the folded corrugated shield 30, there is preferably placed a bridging tape 36 which extends across the edge of the shield 30 that is on the outside of the seam 32. This bridging tape, which may be made of Mylar (Polyethylene terephthalate) or a polyester, prevents the outer edge of the lap seam 32 from indenting into an overall extruded outer jacket 40 which is extruded over the shield 30 and the bridging tape 36. This outer jacket 40 is preferably polyethylene compounded with ultra-violet protecting agents to prevent damage by sunlight if the cable is exposed to sunlight. If desired, the overall jacket 40 can be made of polyvinyl chloride or chlorinated polyethylene. Its function is to provide mechanical protection for the cable prior to installation, during installation, and while in service.

There is a filler or flooding compound 42 applied over the metallic shield 30 and the bridging tape 36. This filler 42 serves as a sealant outside of the shield 30 just as the material 26 serves as a sealant inside the corrugated shield 30. The filler 42 can be made of the same material as the filler 26, and some of it can be applied to the lapped surfaces of seam 32, and it is also applied to the shield 30 before the bridging tapes 36 is placed along the seam 32. Thus all of the space, which might otherwise be open, between any corrugations of the metallic shield 30 and other components of the cable that confront these corrugations is filled with sealant 26 and/or 42. The sealant 42 must be compatible with the overall jacket 40; and it serves to prevent water or moisture from reaching the metallic shield in the event that the outer or overall jacket 40 becomes punctured.

Figure 5:
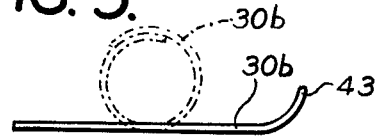
FIG. 5 is a diagrammatic sectional view showing how the strip for the longitudinally folded strip can be preformed to obtain a better seam.

FIG. 5 shows a preformed strip or metal shield 30b which has an edge portion 43 bent transversely out of the plane of the rest of the shield 30b so that when the shield is folded longitudinally around the cable, with the edge 43 on the outside of the lap seam, the edge 43 hugs the lower edge portion more closely. This preforming can be done to the flat strip or during the folding of the strip 30b. The edge portion is bent to a radius of curvature approximately equal to the radius of the outside surface of the insulation shield, and preferably slightly less.

Figure 3:
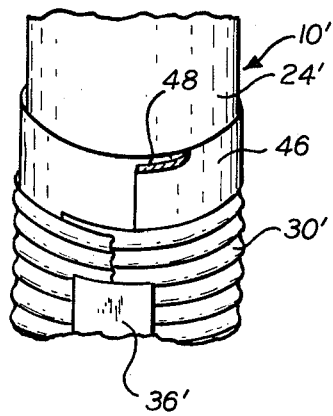
FIG. 3 is a detail view, similar to FIG. 1, but showing a modified construction of a portion of the cable.

FIG. 3 shows a modified construction for the cable of this invention. Parts of the cable of FIG. 3 which correspond with those of FIG. 1 are indicated by the same reference character with a prime appended. The cable 10' of FIG. 3 has an insulation shield 24' which is the same as the corresponding insulation shield in FIG. 1 and all parts of the cable inside of the insulation shield 24' are the same as the construction shown in FIG. 1.

The cable 10' of FIG. 3 differs from the cable shown in FIG. 1 in that it has a longitudinally folded tape 46 around the insulation shield 24' in place of the flooding compount 26 of FIG. 1.

This tape 46 is preferably made of aluminum foil coated on both sides with polyethylene and with the polyethylene adhered to the foil tenaciously by having reactive carboxyl groups in the polyethylene coating. The longitudinally folded tape 46 has a lap seam, indicated by the reference character 48, and the confronting edge portions of the tape 46 at the lap seam are preferably bonded together to make a moisture-proof layer provided by the tape 46 which is mostly plastic and capable of expanding circumferentially as necessary to accommodate thermal cycling of the cable.

A metallic shield 30', similar to the shield 30 of FIG. 1, surrounds the folded tape 46 and has a bridging tape 36' over which an overall jacket is extruded as in the construction shown in FIG. 1. The folded tape 46 takes the place of the flooding material 26 of FIG. 1 in providing a moisture-proof layer around the insulation shield. The cable 10' can be made with filler material, such as the material 42 of FIG. 1, around the outside of the shield 30' and the bridging tape 36'. The cable 10' can be made without any flooding material on the outside of the shield 30 if full reliance is going to be placed on the folded tape 46 for keeping moisture away from the insulation shield 24'.

Figure 4:
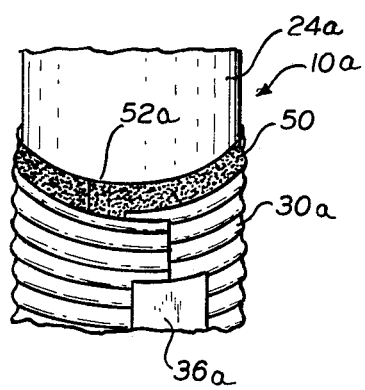
FIG. 4 is a view similar to FIG. 3 but showing a second modified form of the invention.

FIG. 4 shows another modified form of the invention with parts corresponding to those of FIG. 1 indicated by the same reference character with an "a" appended. This construction of FIG. 4 differs from that shown in FIG. 3, in that a tape 50 made of uncured semi-conducting rubber is folded around the insulation shield 24a. This rubber tape 50 is relied upon to keep moisture from reaching the insulation shield 24a. The cable 10a has a corrugated metallic shield 30a with a bridging tape 36a surrounded by an outer jacket (not shown).

The semi-conducting uncured rubber tape 50 is folded with a lap seam, indicated by the reference character 52a and the rubber is soft enough to fill the corrugations of the underside of the folded corrugated metallic shield 30a. The tape 50 prevents longitudinal flow of water along the cable core.

Conventional shields, such as helically applied tape and wire shields, can be used, but are less desirable than the longitudinally folded shield with lap seam. When wire shield is used only, the same conducting flooding compound 26 is used.

Figure 6:
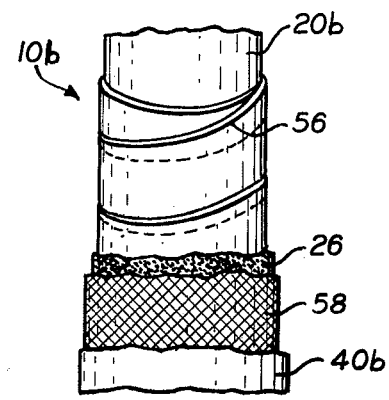
FIG. 6 shows a modified construction with a braided wire metal shield and flooding compound over a helically wrapped semi-conducting tape insulation shield.

FIG. 6 shows a construction in which a cable 10b has extruded insulation 20b with a semi-conducting insulation shield having an overlapping tape 56 helically wrapped about the insulation 20b and adhered to the insulation 20b. A metal braided wire screen 58 is applied over the tape 56 and is flooded with sealant 26. An extruded jacket 40b surrounds the wire shield 58.

The preferred embodiment of the invention and some modifications have been illustrated and described, but other modifications can be made and some features can be used in different combinations without departing from the invention as defined in the claims.

What is claimed is:

1. A method of making an insulated high-voltage power transmission cable resistant to the formation of electrochemical trees, which cable comprises a multi-stranded metal conductor comprising bare individual strands twisted together along helical paths, and a layer of extruded polyethylene insulation material surrounding the conductor, said insulation being subject to the formation of electrochemical trees starting at the inner surface of the insulation where the voltage stress in the insulation is at a maximum and from which said trees progress away from the inner surface and radially outward, comprising preventing air from entering the cable at the ends thereof by completely filling the spaces between the bare strands of the multistranded conductor and any space between the bare conductor strands and the inside surface of the insulation with a flexible sealant material to eliminate access of air to the inside surface of the extruded polyethylene insulation that surrounds the conductor, said sealant comprising a semi-conducting sealant having a drip point and characteristics required for high voltage power transmitting cables, providing a semi-conducting layer between the conductor and the inside surface of the insulation and maintaining a tight contact between the extruded insulation and such layers of the cable as are adjacent to the insulation to prevent access of air into the cable at the ends thereof.

2. The method described in claim 1 characterized by using between the bare strands of the multi-stranded conductor a sealant that is free of fibrous fillers, and that fills interstices between the strands and that has a drip point as high as 130° C., extruding a semiconducting layer of plastic material over the outside of the sealant impregnated stranded conductor and into valleys between strands that form the outside of the stranded conductor, and extruding the insulation over the outside of the semi-conducting layer with an intimate bond to the semi-conducting layer to prevent access of air to the interface between the semi-conducting layer and the inside surface of the insulation.

3. The method described in claim 2 characterized by wiping the outside of the multi-strand conductor after the application of the sealant to the strands of the conductor, wiping the outside of the conductor and the surfaces of the strands exposed on the outside surface of the conductor, but with the wiping limited to substantially less than 180° across the outer surfaces of each strand so that the valleys between strands are not wiped across their full extent, and then extruding the semi-conducting layer into contact with the outside surfaces of the individual exposed strands and into the helical valleys between the outside strands.

4. The method described in claim 1 characterized by applying the metal shield by longitudinally folding around the insulated cable a metal strip that is of a width enough greater than the circumference of the cable, around which the strip is folded to form a metal shield with a longitudinal seam that has substantial circumferential unbonded overlap of the seam edges, and prebending one longitudinal edge portion of the strip to a radius of curvature approximating the intended radius of the shield when on the cable to provide the intended radius of the shield when on the cable to provide a tighter seam for the cable.

5. The method described in claim 2 characterized by the insulation being cross-linked polyethylene and the conductor shield being cross-linked polyethylene with carbon particles distributed therein to make the polyethylene semi-conducting, and the sealant in the interstices of the conductor being compatible with polyethylene and being a compound from the group consisting of asphalt rubber and polyester material compounded to raise the drip point as high as 130° C.

6. The method described in claim 2 characterized by any bonding of the semi-conducting layer to the surface of the conductor strands being light, to facilitate stripping of the semi-conducting layer for making splices and terminations.

7. A method of manufacturing a high voltage power transmission cable having a conductor made of bare metal strands of wire of generally circular cross-section and stranded along helical paths, comprising extruding a semi-conducting layer over the conductor, extruding over the semi-conducting layer a polyethylene insulation that is subject to the formation of electrochemical trees when exposed to high voltage stresses in the presence of at least some moisture, making the cable resistant to the formation of such trees by preventing air from premeating through the semiconducting conductor shield to the interface of the conductor shield and insulation by filling the interstices of the conductor with a sealant material having a drip point higher than 130° C., said sealant material being compatible with the conductor shield and insulation and being flexible at all temperatures to which the cable will be subject when put to its intended use, thereby preventing entry of air into the conductor of the cable at cable ends and during splicing and terminating operations said sealant being extended throughout the full length of the conductor and acting as an air barrier at any location where the cable may be cut to make a shorter length of cable.

* * * * *

UNITED STATES PATENT OFFICE
CERTIFICATE OF CORRECTION

Patent No. 4,130,450                              Dated   December 19, 1978

Inventor(s)  GEORGE BAHDER: GEORGE S. EAGER, Jr., DAVID A. SILVER

It is certified that error appears in the above-identified patent and that said Letters Patent are hereby corrected as shown below:

There is a repetition in claim 4, and in lines 10-11 the words "the intended radius of the shield when on the cable to provide" should be deleted as a printer's error.

Signed and Sealed this

Twentieth Day of March 1979

[SEAL]

Attest:

RUTH C. MASON
Attesting Officer

DONALD W. BANNER
Commissioner of Patents and Trademarks